Dec. 10, 1957 S. FINGERHUT ET AL 2,815,801
LEG CLAMP FOR CHAIRS AND THE LIKE
Filed March 14, 1955 3 Sheets-Sheet 1
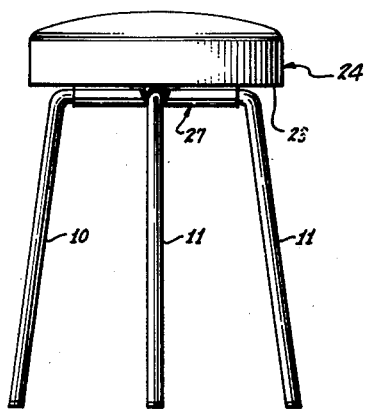
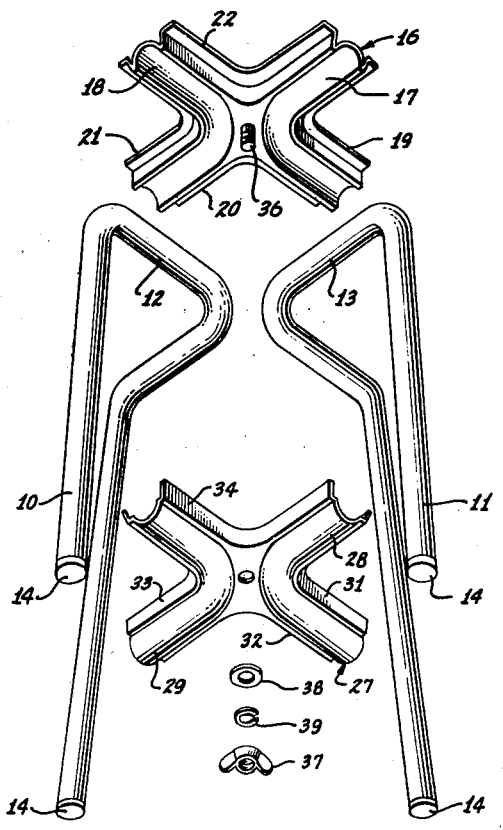
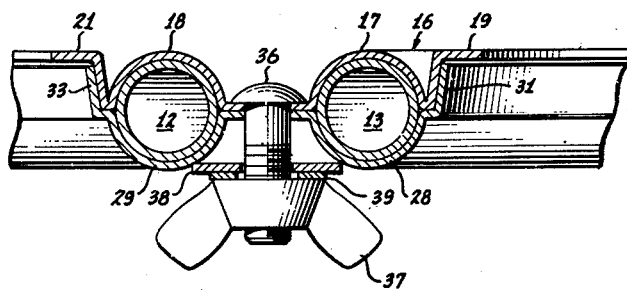
SOLOMON FINGERHUT &
GEORGE M. CARLETON,
INVENTORS.
Huebner, Beehler,
Worrel & Herzig.
ATTORNEYS.
By:

Dec. 10, 1957  S. FINGERHUT ET AL  2,815,801
LEG CLAMP FOR CHAIRS AND THE LIKE
Filed March 14, 1955  3 Sheets-Sheet 2
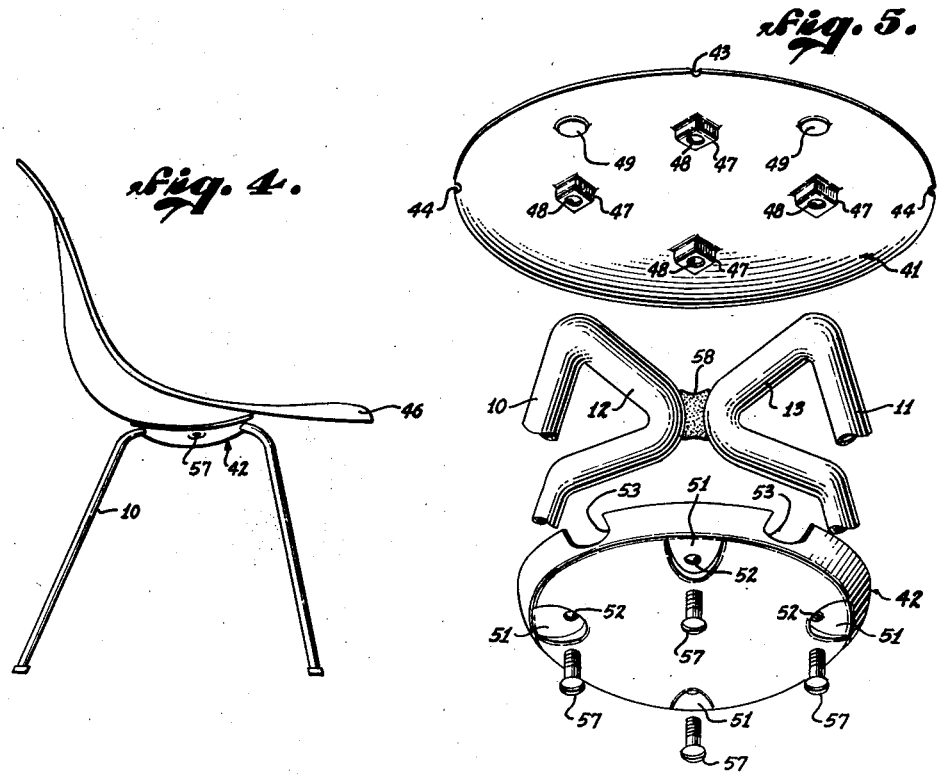
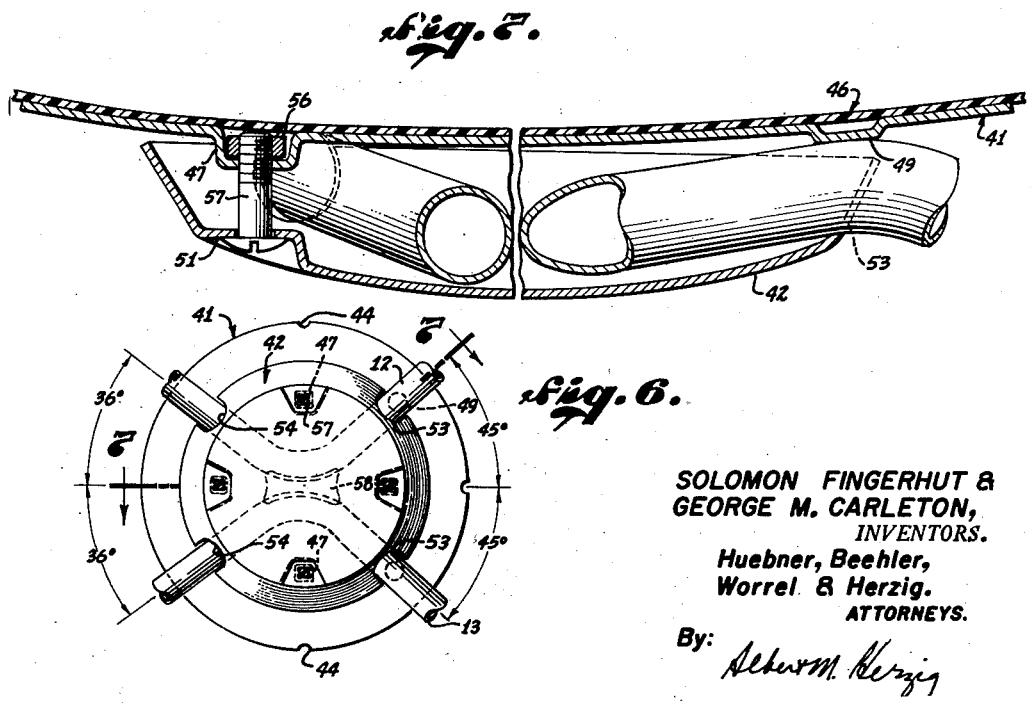
SOLOMON FINGERHUT &
GEORGE M. CARLETON,
INVENTORS.
Huebner, Beehler,
Worrel & Herzig.
ATTORNEYS.

Dec. 10, 1957   S. FINGERHUT ET AL   2,815,801
LEG CLAMP FOR CHAIRS AND THE LIKE
Filed March 14, 1955   3 Sheets-Sheet 3

SOLOMON FINGERHUT &
GEORGE M. CARLETON.
INVENTORS.
Huebner, Beehler,
Worrel & Herzig.
ATTORNEYS.
By:

United States Patent Office 2,815,801
Patented Dec. 10, 1957

2,815,801

LEG CLAMP FOR CHAIRS AND THE LIKE

Solomon Fingerhut and George M. Carleton, Los Angeles, Calif., assignors, by mesne assignments, to Zenith Plastics Company, Gardena, Calif., a corporation of Delaware Application March 14, 1955, Serial No. 493,932

2 Claims. (Cl. 155—196)

The present invention relates to seat supporting means, and particularly such means adapted for attaching the legs of the support to the seat.

In the mass production of seats such as stools and chairs, it is desirable to have a relatively simple and inexpensive means for attaching the legs of the seat thereto. The leg attachment means should be capable of rapid assembly and should provide a safe and secure support for the seat.

Accordingly, it is an important object of the invention to provide an inexpensive means for securely attaching the legs of a seat thereto.

Another object is to provide a safe and durable means for rapidly and conveniently clamping legs to a seat such as a stool or a chair.

Additional objects will become apparent from the following description.

Broadly stated, the invention consists of a seat support comprising an upper clamping plate and a lower clamping plate adapted to clamp the supporting legs to the seat. The legs of the seat preferably are formed in pairs. Each pair of legs is joined at the top by a relatively horizontally disposed portion. These portions preferably are secured together as by welding or bolting to each other, and they may be made to cross each other or they may be positioned adjacent each other without crossing. The upper clamping plate preferably is formed to fit over the horizontally disposed portions of each pair of legs and is adapted for attachment to the seat. The lower clamping plate preferably is formed to fit under the horizontally disposed portions and is adapted to cooperate with the upper plate to clamp the legs to the seat with the aid of auxiliary fastening means.

A more detailed description of the specific embodiments of the invention is given with reference to the drawings, wherein:

Figure 1 is a side elevational view showing an embodiment of the invention applied to a stool;

Figure 2 is a partial, exploded view showing upper and lower plates, two pairs of legs and auxiliary fastening means of the embodiment shown in Figure 1;

Figure 3 is a partial, cross-sectional view showing the horizontal portions of the pairs of legs clamped between the upper and lower plates of the embodiment shown in Figure 1;

Figure 4 is a side elevational view showing another embodiment of the invention applied to a formed chair;

Figure 5 is a partial, exploded view showing upper and lower plates, horizontal portions of two pairs of legs and auxiliary fastening means of the embodiment shown in Figure 4;

Figure 6 is a bottom view of the assembled upper and lower clamping plates, of the embodiment shown in Figure 4, with the horizontal portions of the legs clamped therebetween;

Figure 7 is a cross-sectional view taken on the line 7—7 of Figure 6;

Figure 8:
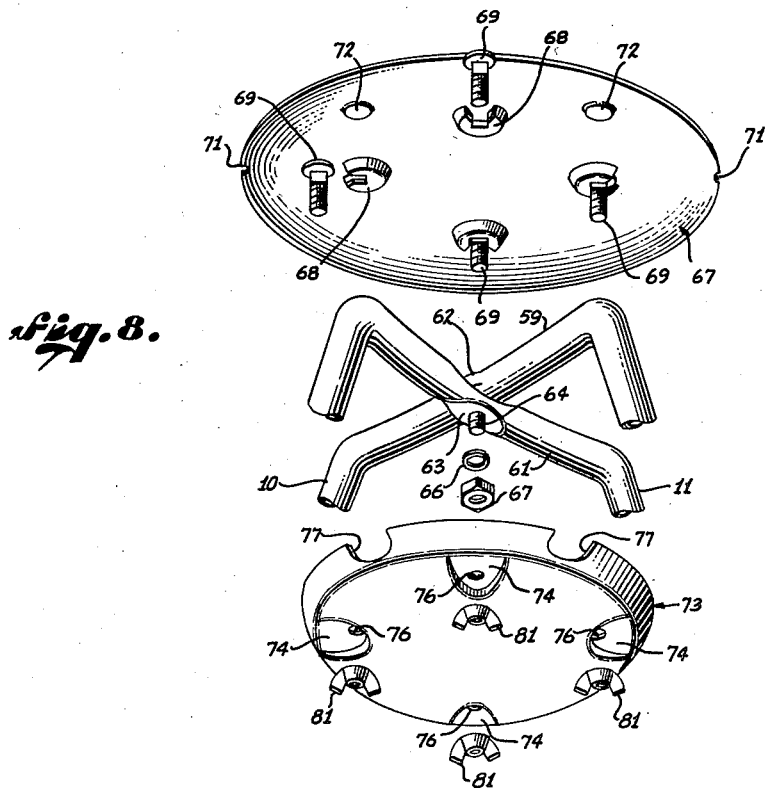
Figure 8 is a partial, exploded view showing upper and lower plates of an additional embodiment, crossed horizontal portions of two pairs of legs, and auxiliary fastening means.

In the specific embodiment shown in Figures 1 to 3, each pair of legs 10 and 11 is formed from a section of tubing or bar stock to have a horizontal V-shaped or U-shaped portion 12 and 13, respectively, joining the pairs of legs 10 and 11 at the upper ends thereof. The lower ends of the legs are provided with protection pads 14.

Upper clamping plate 16 is provided with downwardly facing channels 17 and 18 of V-shape and curvature adapted to receive the horizontal portions 12 and 13, respectively. The channels 17 and 18 are bordered by flanges 19, 20, 21 and 22, formed in plate 16, as best shown in Figure 2. The upper clamping plate 16 is bonded to the bottom surface 23 of a stool sheet or chair bottom with the aid of a suitable bond, cement or adhesive such as epoxy bond, for example. The plate 16 is shown to be X-shaped, but can be of any desired shape, such as circular or square, for example.

The lower clamping plate 27 is made to have the same general shape as upper plate 16, and is provided with upwardly facing channels 28 and 29 adapted to fit snugly around the horizontal portions 12 and 13 while the latter are positioned in channels 17 and 18, as shown in Figure 3. Flanges 31, 32, 33 and 34 bordering channels 28 and 29 are formed on plate 27 and are adapted to fit tightly against flanges 19 to 22 in the assembled seat supporting means. The flanges 31—34 are tapered shoulders abutting similarly tapered shoulders of flanges 19—22 for secure engagement, and the flanges 31—34 normally are forced outwardly when the lower plate 27 is clamped to the upper plate 16.

The assembled seat supporting means is maintained in clamped relationship with respect to the pairs of legs 10 and 11 by any suitable auxiliary fastening means such as a carriage bolt 36 passing through central apertures in clamping plates 16 and 27 and tightened by a wing nut 37 urging washer 38 and lock washer 39 against the external surfaces of channels 28 and 29 of lower clamping plate 27 (Figure 3).

It will be understood that other auxiliary fastening means can be used, and that in addition to channels 17, 18, 28 and 29, pimples or protrusions can be formed at the bases of the channels to bite into horizontal leg portions 12 and 13 for additional tightness. Also, instead of the channels, guides or locators can be used on both clamping plates 16 and 27 to fit around the horizontal leg portions 12 and 13.

In the specific embodiment shown in Figures 4 to 7, the horizontal portions 12 and 13 of the leg pairs 10 and 11 are welded at 58 and clamped between an upper disc-shaped clamping plate 41 and a lower dished clamping plate 42. The upper plate 41 is provided with a front peripheral notch 43 and two side peripheral notches 44 for accurately locating the plate on the bottom of the formed chair body 46. Four square-shaped bosses 47, with bolt holes 48 through the bases thereof, are formed with one each at the front, back and each side location of the plate as shown. Two front bosses 49 also are formed in plate 42 with flat bases. One of the bosses 49 is formed on a center line revolved to an angle of preferably about 45° to the left of a front to back center line of plate 42 and the other is formed on a similar line to the right of the front to back center line. The flat bases of the bosses 49 are designed and located to bear tangentially upon the upper cylindrical surfaces of the horizontal portions 12 and 13 of the leg pairs 10 and 11, as shown in Figure 7.

The lower dished clamping plate 42 is provided with four bosses 51 with bolt holes 52 through the bases thereof. The bosses 51 are positioned around the periphery of the bottom of the plate 42, as shown, to align with the bolt holes 48 of bosses 47 in the upper plate 41. Two front notches 53 are formed through the sloping side wall of lower dished plate 42, one on a center line at an angle of revolution to the left and the other on a center line at an angle of revolution to the right of the front to back center line of the plate 42. These latter angles are made equal to the angles of revolution of the center lines of bosses 49 in upper plate 41, and are preferably about 45°. Two similar rear notches 54 also are formed in plate 42, but these notches 54 preferably are formed one each on center lines at angles of revolution of preferably about 36° to the left and to the right, respectively, of the front to back center line of plate 42.

This embodiment of the invention is assembled by fitting four square nuts 56 (Figure 7) in the four square bosses 47 in upper plate 41 and fixing the upper surface of plate 41 to the bottom of the chair body 46 with peripheral notch 43 to the front of the chair. This can conveniently be done with the aid of a suitable bond or cement, such as epoxy bond, for example, where chair body 46 is of plastic composition, or by welding or brazing where the chair body 46 is made of metal, or by any other suitable fastening method or means. The horizontal leg portions 12 and 13 are then positioned to either side of the front to back center line of plate 41, as shown in Figure 6, so that they bear against the flat bases of bosses 49, as above described. Bosses 49 serve to distribute the load on the front of an occupied chair 46 to the legs and protect the chair seat from local stresses.

Lower clamping plate 42 is then fitted under the horizontal leg portions 12 and 13 so that these portions pass through front and rear notches 53 and 54. Stove bolts 57 are passed through holes 52 and 48 in plates 42 and 41, respectively, and threadedly engaged with nuts 46. The nuts 56 float in bosses 47 in plate 41, but are restricted from turning therein by the surrounding walls of the bosses. Stove bolts 57 are drawn up tightly in floating nuts 56 to tightly clamp horizontal leg portions 12 and 13 between clamping plates 41 and 42 and thus tightly and securely to the bottom of the seat of chair body 46.

In the specific embodiment shown in Figures 7 and 8, the horizontal portions 59 and 61 of the leg pairs 10 and 11 are crossed at flattened mid-portions 62 and 63. Each of the flattened portions 62 and 63 is provided with a bolt hole to mutually register and receive a bolt 64. The pairs of legs 10 and 11 are bolted together at the desired angles, described above and illustrated in Figure 6, by means of a lock washer 66 and a nut 67 threadedly tightened on bolt 64.

Figure 9:
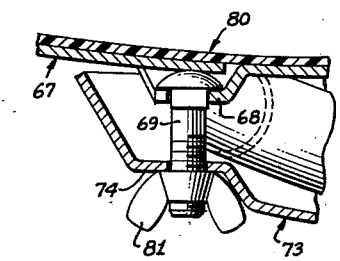
Figure 9 is a fragmentary, cross-sectional view showing means for fastening the lower plate to the upper plate of the embodiment of Figure 8.

The upper plate 67, shown in Figure 8, is similar to upper plate 41, illustrated in Figure 5, except that bosses 68 are rounded and slotted to receive the heads of carriage bolts 69, as best shown in Figure 9. The cut portions of the bosses 68 are pushed inward sufficiently to form the slot and bear against the tops of the bolt heads of bolts 69. The front peripheral notch (not shown), the side peripheral notches 71, and the two front bosses 72 shown in upper plate 67 are similar to notches 43 and 44 and bosses 49 in the upper plate of Figure 5, and serve the same locating and load distributing functions described above in connection with the description of the embodiment of Figures 4 to 7.

The lower dished clamping plate 73 is similar to the lower clamping plate 42 of Figure 5 and is provided with four bosses 74 with bolt holes 76 through their bases, and with two front notches 77 and two rear notches (not shown). The sizes and positioning of the bolt holes 76 and the front and rear notches with respect to the bolts 79 and the bolted horizontal portions 59 and 61 of the leg pairs 10 and 11 is determined as described above in connection with the embodiment of Figures 4 to 7.

The embodiment of Figures 8 and 9 is assembled as follows. The upper plate 67 is bonded to the bottom surface 80 of a stool sheet or chair bottom with the aid of a suitable material such as epoxy bond, for example, after proper positioning with the aid of peripheral notches 71. The heads of the bolts 69 are inserted in the slots in bosses 68 and the previously bolted leg pairs 10 and 11 are positioned so that their horizontal portions pass through notches 77. The leg pairs 10 and 11 are then clamped between the upper plate 67 and the lower plate 73, as described in connection with the previous embodiment, by tightening wing nuts 81 on bolts 69.

The clamping plates 16, 27, 41, 42, 67 and 73 of the specific embodiments described above can conveniently be stamped from about 18 or 20 gage cold rolled steel but any other suitable manufacturing means or materials of construction can be used. Similarly, the legs can be made from sections of welded steel tubing. The chair body 46 can be formed of plastic, glass cloth reinforced plastic, laminated wood, aluminum or any other suitable metallic or non-metallic materials.

The foregoing description is explanatory only, and is given primarily to illustrate several specific embodiments of the invention. It is understood that many other variations in the structure, design and details of the seat supporting means described above will occur to one skilled in the art. Accordingly, it is understood that such changes and modifications in the structure, design and details of the specific embodiments illustrated and described above may be made within the scope of the appended claims without departing from the spirit of the invention.

What is claimed is:

1. A seat support comprising two pairs of tubular legs, the legs of each of the pairs being joined at the tops thereof by a horizontally disposed tubular leg portion, the horizontally disposed tubular leg portions being attached to each other in crossed relationship, an upper clamping plate generally disc-shaped and adapted for cementing to the underside of the seat, the upper clamping plate being provided with boss means adapted to bear on the horizontally disposed tubular leg portions for distributing loads from the seat to the legs and protecting the seat from local stresses, a lower clamping plate generally dished and adapted for fitting under and around the horizontally disposed and crossed tubular leg portions positioned below the upper clamping plate, the lower clamping plate being adapted to cooperate with the upper plate to clamp the legs to the seat, and fastening means for clamping the legs between the plates.

2. A seat support comprising two pairs of tubular legs, the legs of each of the pairs having a horizontally disposed tubular leg portion, means for clamping said pairs of legs in said horizontal portion in seat supporting relationship below the seat, said means comprising an upper clamping plate means adapted for cementing to the underside of the seat, a lower clamping plate means adapted for fitting under and around said horizontally disposed tubular leg portions positioned below the upper clamping plate means, the lower clamping plate means being adapted to cooperate with the upper plate means to clamp the legs to the seat, and fastening means for clamping the legs between the plates wherein the upper clamping plate means is provided with boss means adapted to bear on the horizontally disposed tubular leg portions for distributing loads from the seat to the legs and protecting the seat from local stresses.

References Cited in the file of this patent

UNITED STATES PATENTS

| | | |
|---|---|---|
| 644,506 | Dromgold | Feb. 27, 1900 |
| 2,528,950 | Engstrom | Nov. 7, 1950 |
| 2,588,417 | Schladermundt | Mar. 11, 1952 |

FOREIGN PATENTS

| | | |
|---|---|---|
| 282,679 | Switzerland | Aug. 16, 1952 |